United States Patent
Huls

(10) Patent No.: US 8,925,482 B2
(45) Date of Patent: Jan. 6, 2015

(54) METHOD OF MILKING A GROUP OF DAIRY ANIMALS

(75) Inventor: Michel Hubert Johan Huls, Delft (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/160,529

(22) Filed: Jun. 15, 2011

(65) Prior Publication Data

US 2011/0239944 A1    Oct. 6, 2011

Related U.S. Application Data

(63) Continuation of application No. PCT/NL2009/000235, filed on Nov. 27, 2009.

(30) Foreign Application Priority Data

Dec. 16, 2008 (NL) .................................... 1036320

(51) Int. Cl.
  *A01J 5/00* (2006.01)
  *A01J 5/007* (2006.01)
  *A01K 1/12* (2006.01)
  *A01J 7/02* (2006.01)

(52) U.S. Cl.
  CPC . *A01J 7/022* (2013.01); *A01J 5/007* (2013.01)
  USPC ...................................... 119/14.03; 119/14.18

(58) Field of Classification Search
  USPC .................... 119/14.01, 14.03, 14.18
  See application file for complete search history.

(56) References Cited

U.S. PATENT DOCUMENTS

| 4,061,504 | A | * | 12/1977 | Zall et al. ...................... 134/95.1 |
| 4,452,268 | A | * | 6/1984 | Icking et al. .................. 137/240 |
| 4,516,530 | A | * | 5/1985 | Reisgies et al. ............ 119/14.08 |
| 4,803,950 | A | * | 2/1989 | Griffin et al. .............. 119/14.55 |
| 5,896,828 | A | * | 4/1999 | Kronschnabel et al. ... 119/14.46 |

(Continued)

FOREIGN PATENT DOCUMENTS

| DE | 102007051435 A1 | 5/2008 |
| EP | 1234496 A2 | 8/2002 |
| WO | 2004068940 A1 | 8/2004 |

OTHER PUBLICATIONS

R. Eicher & et al "Mammite à staphylocoques dorés—quelles solutions?" Internet article, (online) Oct. 7, 2005, XP002538421.

(Continued)

*Primary Examiner* — David Parsley
(74) *Attorney, Agent, or Firm* — Hoyng Monegier LLP; Minerva Rivero; David P. Owen

(57) ABSTRACT

The invention relates to a method of milking a group of dairy animals including a first subgroup and a second subgroup by an automatic milking system, and wherein the milking system is flushed after a dairy animal from the second subgroup has been milked. The flushing step is postponed after a dairy animal from the second subgroup has been milked until at least a minimum number greater than or equal to two dairy animals from the second subgroup has been milked successively, or a subsequent dairy animal belonging to the first subgroup has been identified and the decision has been made that the dairy animal from the first subgroup presenting itself can be milked, or by postponing the milking of a dairy animal from the second subgroup until at least a minimum number greater than or equal to two dairy animals from the first subgroup has been milked successively.

12 Claims, 4 Drawing Sheets

(56) References Cited

U.S. PATENT DOCUMENTS

| | | | | |
|---|---|---|---|---|
| 5,996,529 | A * | 12/1999 | Sissom et al. | 119/14.14 |
| 6,089,242 | A * | 7/2000 | Buck | 134/57 R |
| 6,814,026 | B2 * | 11/2004 | Guo | 119/14.02 |
| 7,055,458 | B2 * | 6/2006 | Guo | 119/14.04 |
| 7,086,348 | B2 * | 8/2006 | Guo | 119/14.02 |
| 7,874,263 | B2 * | 1/2011 | Schulte | 119/14.02 |
| 8,127,714 | B2 * | 3/2012 | Sundborger et al. | 119/14.02 |
| 8,191,506 | B2 * | 6/2012 | Caldenius | 119/14.08 |

OTHER PUBLICATIONS

International Search Report of PCT/NL2009/000235 filed on Nov. 27, 2009.

* cited by examiner

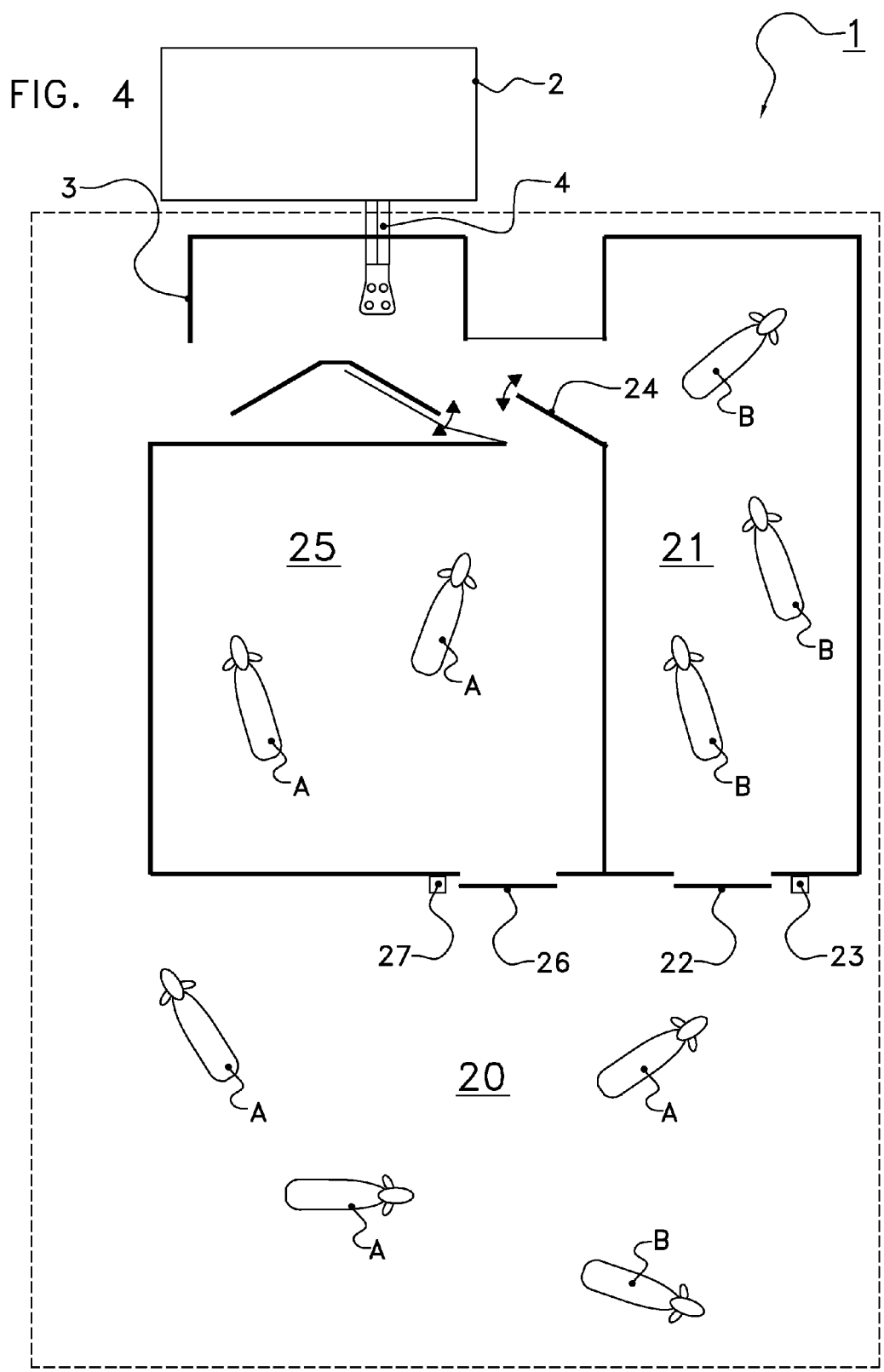

METHOD OF MILKING A GROUP OF DAIRY ANIMALS

CROSS REFERENCE TO RELATED APPLICATIONS

This application is a continuation of PCT application number PCT/NL2009/000235 filed on 27 Nov. 2009, which claims priority from Netherlands application number NL 1036320 filed on 16 Dec. 2008. Both applications are hereby incorporated by reference in their entireties.

BACKGROUND OF THE INVENTION

1. Field of the Invention

The invention relates to a method of milking a group of dairy animals by means of an automatic milking system, wherein the group comprises at least two subgroups, wherein a first subgroup comprises dairy animals which give a first type of milk and a second subgroup comprises dairy animals which give a second type of milk, and wherein the milking system has to be flushed after a dairy animal from the second subgroup has been milked and before a dairy animal from the first subgroup is milked, wherein the method comprises: a) identifying a dairy animal which presents itself to be milked, b) making a decision on whether the dairy animal presenting itself is to be milked, c) if desired, milking the dairy animal, and d) flushing the milking system after milking a dairy animal from the second subgroup.

2. Description of the Related Art

A group of dairy animals, for example a group of cows, can generally comprise different subgroups of dairy animals which give different types of milk. These different types of milk may, for example, comprise milk for consumption, beestings, milk from cows suffering from mastitis, or milk from cows treated with antibiotics. It is not desirable to collect these different types in one and the same milk reservoir. Mixing milk for consumption with other types of milk may result in the milk for consumption no longer being suitable for consumption.

Milk which is not to be mixed with milk for consumption will be referred to below as separation milk. After milking a cow giving separation milk, it is desirable and often compulsory to flush the milking system before milking a cow giving milk for consumption. Flushing the milking system takes a relatively long time. In addition, the flushing of the milking system requires large amounts of flushing liquid, for example clean water.

With groups of dairy animals comprising relatively many dairy animals which give separation milk, the milking system will therefore have to be cleaned relatively often. During flushing, the milking system cannot be used, as a result of which the milking system is used less efficiently.

An example of a group of dairy animals which comprises a relatively large number of dairy animals giving separation milk is a group of dairy animals whose milking cycles are synchronous to a high degree. In such a group, relatively many dairy animals can simultaneously give beestings which are unsuitable for consumption and which should not be mixed with the milk for consumption. Another example is a group of dairy animals with relatively many sick cows which are treated with antibiotics.

BRIEF SUMMARY OF THE INVENTION

It is an object of the invention to provide a method of milking a group of dairy animals which makes it possible to use the milking system more efficiently, in particular by carrying out the flushing of the milking system after the milking of a dairy animal giving separation milk more efficiently.

According to a first aspect of the invention, the flushing of the milking system after the milking of a dairy animal from the second subgroup is postponed until at least one of the following criteria has been met.

According to a first criterion, the flushing step is postponed until at least a minimum number greater than or equal to two dairy animals from the second subgroup has been milked successively. Successively milking a minimum number, for example five, dairy animals from the second subgroup, for example a subgroup which gives beestings, and only then flushing the milking system, prevents a flushing step from being executed after the milking of each of the dairy animals. The minimum number of dairy animals from the first subgroup which would be milked successively when using this criterion is thus at least two.

According to a second criterion, the flushing of the milking system is postponed until a subsequent dairy animal belonging to the first subgroup has been identified and the decision has been made that the dairy animal from the first subgroup presenting itself can be milked. According to this criterion, after a dairy animal from the second subgroup has been milked, the flushing step is delayed until it is certain that the next dairy animal to be milked is from the first subgroup and that the system therefore has to be flushed before this dairy animal is milked. This has the advantage that when the next dairy animal to be milked is a dairy animal from the second subgroup, no flushing step has to be carried out between the two milkings.

It should be noted that it is possible that, in a practical application of this criterion, the respective dairy animal from the first subgroup is nevertheless refused when the decision has been made to flush the milking system. Thus, the dairy animal is prevented from having to wait a long time before it is milked, since the flushing of the milking system takes some time. With such an application, the flushing is postponed until the decision has been made that the dairy animal from the first subgroup presenting itself can be milked and therefore the second criterion has been met.

According to a second aspect of the invention, the milking of a dairy animal from the second subgroup is postponed until at least a minimum number greater than or equal to two dairy animals from the first subgroup has been milked successively. By milking a certain minimum number of dairy animals from the first subgroup, that is to say at least two, and not milking a dairy animal from the second subgroup in between, interim flushing of the milking system can be prevented. The criterion according to the second aspect of the invention can also be applied in combination with one or both criteria according to the first aspect of the invention.

By applying one or more of the abovementioned criteria, the number of flushing operations per 24-hour period can be reduced, as a result of which the milking system can be used more efficiently. This also has the advantage that less flushing liquid and energy is used for flushing the milking system.

In one embodiment, the flushing of the milking system is postponed until at least a minimum number greater than or equal to two dairy animals from the second subgroup has been milked successively, and a subsequent dairy animal belonging to the first subgroup has been identified and the decision has been made that the dairy animal from the first subgroup presenting itself can be milked.

In this embodiment, two criteria are applied together, with a minimum number of dairy animals from the second subgroup being milked first. Subsequently, a check is performed to determine if the next dairy animal to be milked is from the second subgroup. If this is the case, the flushing can be postponed until after the milking of this dairy animal, and any further dairy animals from the second subgroup. If the next dairy animal to be milked is from the first subgroup, the dairy animal can be milked after the milking system has been flushed.

It is also possible to postpone the flushing step until a different combination of each of the three criteria has been met.

In one embodiment, after a dairy animal from one of the two subgroups has been milked, dairy animals from the other of the two subgroups are refused until the minimum number of dairy animals from said one of the two subgroups has been milked. By refusing dairy animals from a certain subgroup, a number of dairy animals from the other subgroup can be milked successively.

In a further embodiment, the method furthermore comprises the milking of a dairy animal from the other subgroup, once a maximum number of dairy animals from the other subgroup has been refused. By establishing a maximum number of dairy animals from the other subgroup to be refused, it is possible to prevent the milking system from not being used for an extended period of time by reason of the fact that there are no or an insufficient number of dairy animals from the subgroup to be milked, while there are available dairy animals from another subgroup. When the maximum number of refusals has been reached, a dairy animal from the other subgroup can be milked regardless of whether the desired minimum number of dairy animals to be milked from the subgroup to be milked has been reached.

In one embodiment, it is possible to gather a number of dairy animals from a certain subgroup at the milking system and to have these milked successively without dairy animals from the other subgroup being able to position themselves among these gathered dairy animals.

Gathering may be carried out manually by a farmer. In such an embodiment, it is possible for the farmer to indicate manually at least how many dairy animals from the one subgroup have to be milked, before a dairy animal from the other subgroup can be milked.

It is also possible for the gathering to be carried out automatically, for example by means of a waiting area which is provided with an automatic entry gate. The entry gate can determine the identity of a dairy animal by means of an identification system and establish whether the dairy animal belongs to the respective subgroup and on the basis thereof decide whether or not to allow the dairy animal to enter the waiting area. The number of dairy animals present in the waiting area can then be used as the minimum number of dairy animals to be milked from the respective subgroup.

In one embodiment, the minimum number of dairy animals to be milked from one of the two subgroups is determined on the basis of the ratio between dairy animals from the one subgroup and the other subgroup and/or between the number of expected milkings in the one subgroup and the other subgroup per unit time and/or the type of the second type of milk.

If there are a lot of dairy animals from one subgroup, it may be desirable to milk many dairy animals from this subgroup in succession before milking a dairy animal from the other subgroup. Thus, it is possible to use the ratio between the number of dairy animals from the one subgroup and the other subgroup as a basis for determining a minimum number of dairy animals which is to be milked per subgroup.

Also, the number of milkings which can be expected per time period, for example per 24-hour period, for each subgroup or the type of milk of the subgroup in question can serve as a basis for determining this minimum number of dairy animals to be milked per subgroup. For example, with certain types of separation milk, it is desirable to flush more often than with other types of separation milk.

In one embodiment, the minimum number of dairy animals to be milked from the one of the two subgroups is reduced if more dairy animals from the other of the two subgroups present themselves than from the one of the two subgroups. Also, the minimum number of dairy animals to be milked from the one of the two subgroups can be increased if more dairy animals from the one of the two subgroups present themselves than from the other of the two subgroups.

By actively adjusting the minimum number of dairy animals of a certain subgroup which is to be milked successively on the basis of the ratio between the number of dairy animals from the one subgroup and the other subgroup which present themselves, it is possible to prevent the milking system from not being used for an extended period of time because no or substantially fewer dairy animals from the desired subgroup present themselves. Alternatively, it is possible to lower the minimum number of dairy animals to be milked successively if a certain period of time has elapsed since the last dairy animal of the respective subgroup was milked.

The invention further relates to a system, e.g., a construction for milking a group of dairy animals, wherein the group comprises at least two subgroups, wherein a first subgroup comprises dairy animals which give a first type of milk and a second subgroup comprises dairy animals which give a second type of milk, and wherein the milking system has to be flushed after a dairy animal from the second subgroup has been milked and before a dairy animal from the first subgroup is milked, comprising: a milking system for milking the dairy animal, an identification system for identifying a dairy animal which presents itself for milking, a flushing device for flushing the milking system, and a control device, wherein the control device is configured to: decide whether the dairy animal presenting itself is to be milked,
actuate the milking system in order to milk a dairy animal, if desired, and activate the flushing device after the milking of a dairy animal from the second subgroup, wherein the control device is configured to postpone milking of a dairy animal from the second subgroup until at least a minimum number greater than or equal to two dairy animals from the first subgroup has been milked successively.

In another embodiment, the invention relates to a construction for milking a group of dairy animals, wherein the group comprises at least two subgroups, wherein a first subgroup comprises dairy animals which give a first type of milk and a second subgroup comprises dairy animals which give a second type of milk, and wherein the milking system has to be flushed after a dairy animal from the second subgroup has been milked and before a dairy animal from the first subgroup is milked, comprising: a milking system for milking the dairy animal, an identification system for identifying a dairy animal which presents itself for milking, a flushing device for flushing the milking system, and a control device, wherein the control device is configured to: decide whether the dairy animal presenting itself is to be milked, actuate the milking system in order to milk a dairy animal, if desired, and activate the flushing device after the milking of a dairy animal from the second subgroup, wherein the control device is configured to postpone milking of a dairy animal from the second subgroup until at least a minimum number greater than or equal to two dairy animals from the first subgroup has been milked successively.

BRIEF DESCRIPTION OF THE DRAWINGS

The features and advantages of the invention will be appreciated upon reference to the following drawings, in which:

FIG. 4 shows a third embodiment of the invention.

DESCRIPTION OF ILLUSTRATIVE EMBODIMENTS

Figure 1:
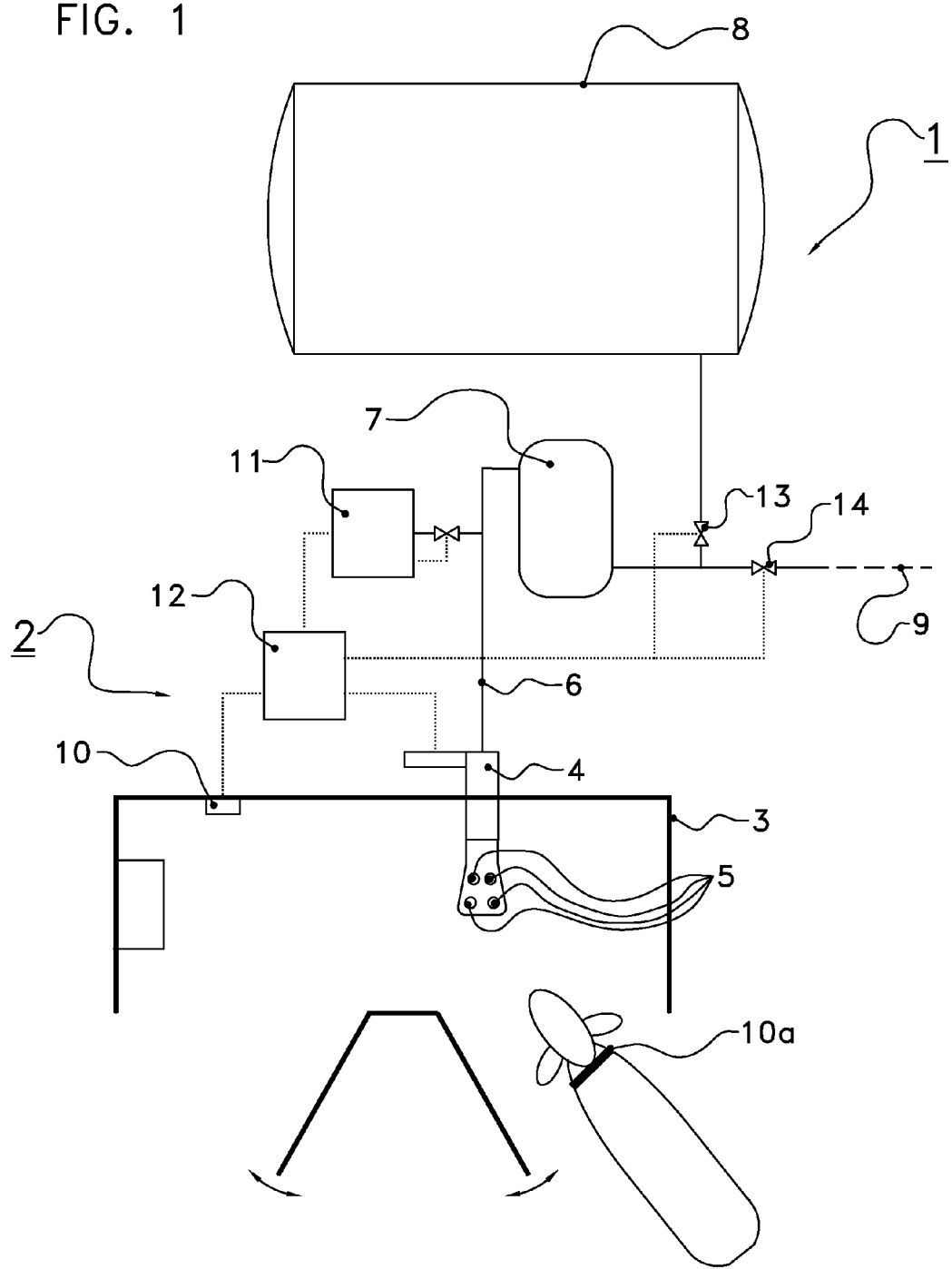
FIG. 1 shows a first embodiment of a milking system according to the invention.

The following is a description of certain embodiments of the invention, given by way of example only and with reference to the drawings. FIG. 1 shows a construction according to the invention, denoted overall by reference numeral 1. The construction comprises a milking system 2 with a milking box 3 for receiving a dairy animal, and a milking robot 4 for placing milking cups 5 on the teats of the dairy animal. Each of the milking cups 5 is connected to a milking line 6 for taking the milk to a temporary milk reservoir 7, for example a milk glass, for collecting the milk during milking. Depending on the type of milk, the milk is passed from the temporary reservoir 7 to a reservoir 8 for milk for consumption or another destination 9, for example another milk reservoir or the sewer, after milking.

The milking system 2 can be used for milking a group of dairy animals, of which a first subgroup gives milk for consumption and a second subgroup gives separation milk. The milk for consumption produced by the first subgroup will be stored in the reservoir 8 for milk for consumption so that it can later be collected by a milk-collecting service, while the separation milk is transported away separately to another destination 9, for example stored in a second reservoir or discharged into the sewer. It is possible for different types of separation milk, for example beestings and milk containing antibiotics, to be transported away to different destinations. In that case, there are more than two subgroups.

An identification system 10 is provided which can identify a dairy animal which is situated in the milking box, for example by means of a transponder 10a attached to the collar of the dairy animal.

The construction 1 comprises a flushing device 11 for flushing the milking system 2. It should be noted that it is known to provide a flushing device for flushing a milking system. Such a flushing device is for example disclosed in WO-A-96/16536, which is hereby incorporated by reference in its entirety. The flushing device disclosed in this patent is used to flush the milking system after a certain level of contamination of the milking system has been detected and/or after a certain period of time has elapsed.

In addition to the periodic flushing of a milking system as disclosed in WO-A-96/16536, the milking system 2 has to be flushed after a dairy animal giving separation milk has been milked by means of the flushing device 11 before a dairy animal giving milk for consumption is milked. To this end, for example the milking line 6, the temporary milk reservoir 7 and the milking cups 5 are flushed with an amount of flushing liquid in order to remove any separation milk which has remained behind.

In the embodiment from FIG. 1, a control device 12 is provided for actuating the milking system 2 in order to milk a dairy animal present in the milking box 3. The control device 12 is furthermore configured to actuate valves 13 and 14 which are installed in the milking line 6 and with which the milk can be passed from the temporary milk reservoir 7 to the reservoir 8 for milk for consumption or the other destination 9. The control device 12 is also provided in order to activate the flushing device 11, if desired.

The control device 12 is configured to postpone flushing of the milking system 2 after a dairy animal from the second subgroup has been milked until at least a minimum number greater than or equal to two, for example five, dairy animals from the second subgroup has been milked successively, or until a next dairy animal which belongs to the first subgroup has been identified and the decision has been made that the dairy animal from the first subgroup presenting itself is to be milked. As an alternative or in addition, the control device 12 may be configured to postpone the milking of a dairy animal from the second subgroup until at least a minimum number greater than or equal to two dairy animals from the first subgroup has been milked successively.

By applying these criteria, the construction 1 can be used more efficiently because the milking system is flushed less often per time period.

Figure 2:
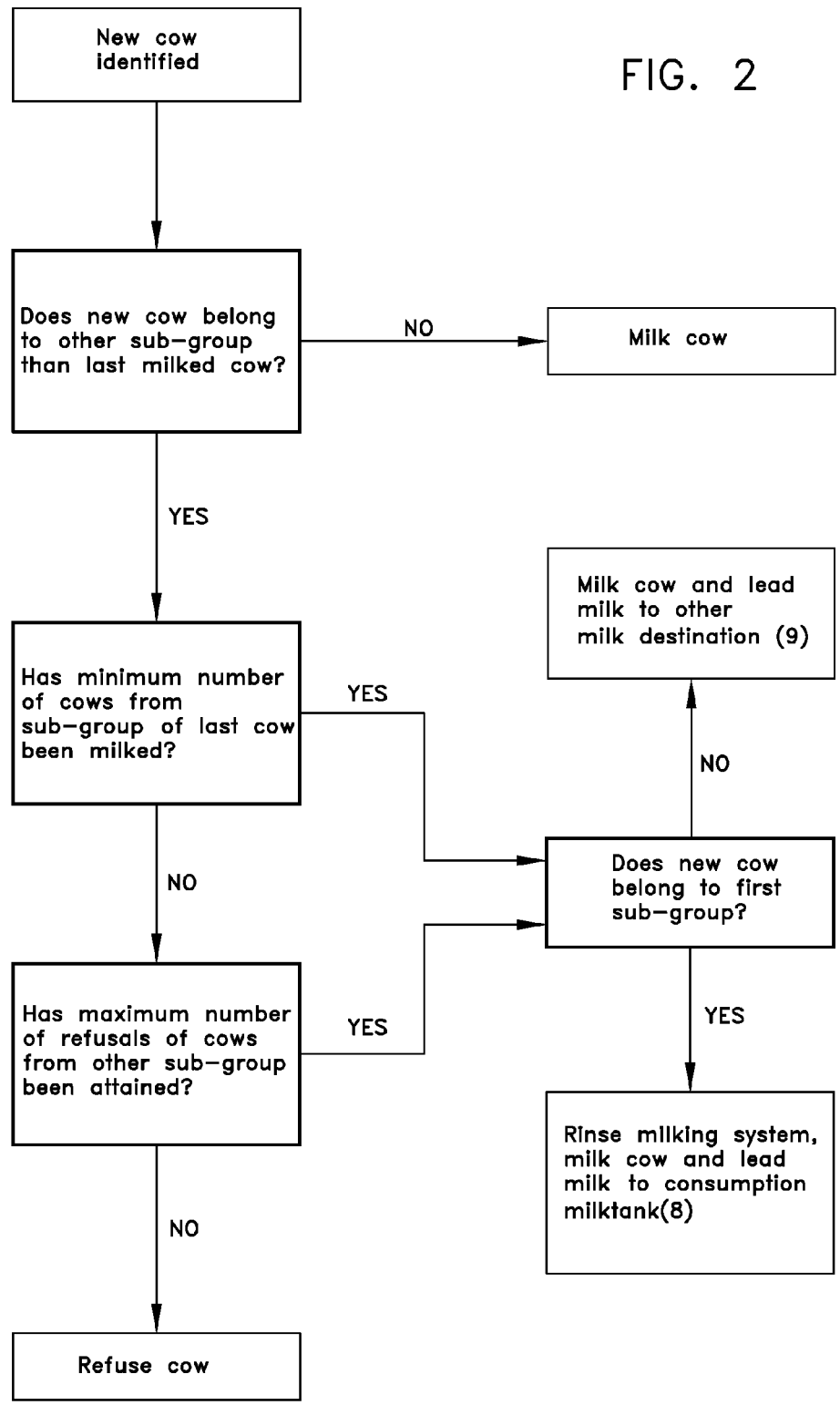
FIG. 2 shows a diagram with a possible embodiment of the application of the criteria for postponing the flushing step according to the invention.

FIG. 2 shows an example of how a combination of said three criteria can be applied in the control device 12 when milking a group of cows. The group of cows is divided into a first subgroup which gives milk for consumption and a second subgroup which gives separation milk. Upon entering the milking box 3, a dairy animal is identified by means of the identification system 10. On the basis of this identification, the control system can determine which subgroup the cow belongs to. This subgroup is checked by the control device 12 against the subgroup of the last cow milked by the milking system. If the new cow belongs to the same subgroup as the last cow which was milked, the cow can be milked immediately.

If the new cow does not belong to the same subgroup, it is determined whether the minimum number of cows from the respective subgroup to be milked successively has already been reached. This number may have been determined automatically or may have been input manually, as will be described below.

If the minimum number of cows from the respective subgroup has not yet been milked, it is in principle not desirable to milk the new cow belonging to another subgroup. However, in order to prevent the milking system from not being used for an extended period of time because the minimum number of cows from the respective subgroup to be milked successively is not reached, there is a further criterion which depends on the number of refusals of cows from the other subgroup. According to this criterion, only a maximum number of cows from a subgroup can be refused.

If the maximum number of refusals of cows from the respective subgroup has not yet been reached, the new cow will be refused, i.e. will not be milked. If desired, the cow can be driven from the milking box 3 by means of stimuli in order to empty the milking box 3 for a new cow.

If the minimum number of cows in the respective subgroup has been milked or if the maximum number of cows from the other subgroup to be refused has been reached, the new cow which belongs to another subgroup will actually be milked. Prior to the milking of the new cow, the milking system 2 has to be checked in order to determine if it has to be flushed. In the illustrated diagram, the new cow is checked to see if it belongs to the first subgroup. This in principle already took place when the cow was identified, i.e. when it was determined whether the cow belongs to another subgroup.

If the new cow is from the first subgroup, the milking system 2 will be flushed before the new cow is milked. It should be noted that it is possible that, in a practical application, the respective dairy animal from the first subgroup is nevertheless refused. Thus, the dairy animal is prevented from having to wait a long time before it is milked, since the flushing of the milking system takes some time. At the end of the flushing operation or thereafter, a new cow will then be allowed into the milking box 3, preferably a dairy animal from the first subgroup so that the milking system 2 has not been flushed unnecessarily.

Before, during or after the milking of the new cow from the first subgroup, the valves 13, 14 will be actuated in order to pass the milk for consumption of the new cow from the temporary milk reservoir 7 to the reservoir 8 for milk for consumption after milking has taken place.

During or after milking, it is furthermore possible to check if the milk from the new cow is indeed suitable for consumption. If this is not the case, because the cow has, for example, become ill, then the milk can still be passed from the temporary milk reservoir 7 to another destination 9.

If the new cow is from the second subgroup, it is not necessary to flush the milking system 2 before milking the new cow. In that case, the control device 12 will actuate the valves 13, 14 in order to pass the separation milk to another destination 9 than the reservoir 8 for milk for consumption after milking, unless the milk is actually found to be suitable for consumption during inspection.

In the construction 1, a minimum number of dairy animals from a subgroup is used which has to be milked successively. This may have the advantage that less time is lost with flushing the milking system 2. In this case, it is important, however, not to unnecessarily refuse dairy animals from the other subgroup for a relatively long period of time because the minimum number from the one subgroup has not been reached yet, while no dairy animals from this subgroup present themselves.

It is therefore desirable to adapt the minimum number of dairy animals from a certain subgroup to be milked successively to the dairy animals from the respective subgroup presenting themselves. To this end, the minimum number of dairy animals from a certain subgroup to be milked successively can be determined automatically or be input manually.

The minimum number can, for example, be determined on the basis of the ratio between dairy animals from the one subgroup and the other subgroup and/or between the number of milkings in the one subgroup and the other subgroup to be expected per unit time and/or the type of the second type of milk.

In this case, it is possible to actively adapt the number, depending on the dairy animals which present themselves. For example, if fewer dairy animals from the other subgroup present themselves than from the subgroup whose minimum number has not been reached yet, then the minimum number can be increased.

On the other hand, if more dairy animals from the other subgroup present themselves than from the subgroup whose minimum number has not yet been reached, it is possible to reduce the minimum number. It is also possible to reduce the minimum number of dairy animals to be milked successively if a certain period of time has elapsed since the milking of the last dairy animal from the respective subgroup.

It is also possible, as is the case in the embodiment from FIG. 2, to set a maximum number of dairy animals from a certain subgroup to be refused. If this maximum number of dairy animals to be refused has been reached, a cow from the other subgroup can be milked, regardless of whether the desired minimum number of dairy animal to be milked from the respective subgroup has been reached. On the basis of the number of refused dairy animals from another subgroup, it is furthermore possible to adjust the minimum number of dairy animals from a certain subgroup to be milked successively.

In the illustrated embodiment from FIG. 1, the control device 12 is configured to determine and, if desired, adjust the minimum number of dairy animals per subgroup to be milked successively, depending on the number of dairy animals from the one or the other subgroup which present themselves.

Figure 3:
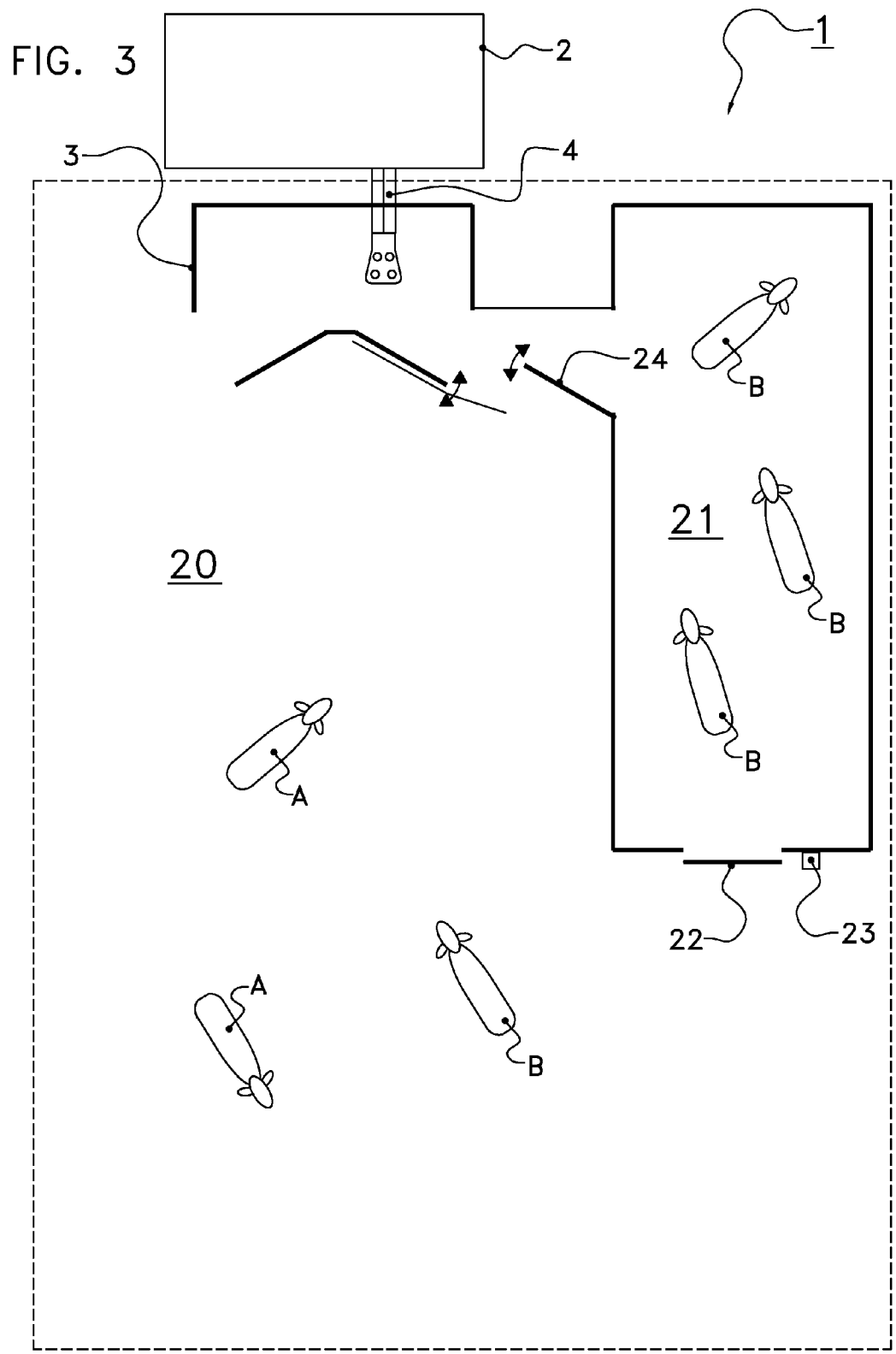
FIG. 3 shows a second embodiment of the invention.

FIG. 3 shows an embodiment of a construction 1 comprising a milking system 2 with a milking box 3 and a milking robot 4. The milking system 2 can furthermore be designed according to the milking system 2 from FIG. 1 and is not shown in any more detail in FIG. 3. The milking box 3 is arranged in an enclosed space 20, for example a pasture or a stable, in which a group of dairy animals A, B is present. The group comprises two subgroups, with the dairy animals A from the first subgroup giving milk for consumption and the dairy animals B from a second subgroup giving separation milk.

The construction 1 has a waiting area 21 for gathering a number of dairy animals from of a certain subgroup. The drawing shows that dairy animals B from the second subgroup are gathered in the waiting area 21. Gathering may have been carried out manually by a farmer. It is also possible to provide an automatic entry gate 22 for the waiting area which only allows dairy animals from the respective subgroup to enter. To this end, the entry gate 22 may be provided with an identification system 23 which is capable of determining to which subgroup a dairy animal belongs and, as a function thereof, whether to open the gate or not.

If a number of dairy animals from a certain subgroup are gathered in the waiting area 21, these dairy animals can easily be milked successively.

In order to successively milk the dairy animals in the waiting area 21, an access system 24 is provided which selectively allows access to dairy animals from the waiting area 21 or directly from the enclosed space 20. The access system 24 may be designed to be automatic, but may alternatively also be manually operable. If desired, the access system may be provided with an identification system for determining the identity of dairy animals which turn up at the access system 24 from the waiting area 21 or directly from the enclosed space 20.

The number of dairy animals present in the waiting area 21 can be used as the minimum number of dairy animals from this subgroup to be milked successively. This may be done manually by the farmer, in particular when the farmer has also rounded up the dairy animals B in the waiting area 21 himself. It is also possible that the minimum number dairy animals is determined based on information from the automatic entry gate 22 and/or the automatic access system 24.

For example, if the automatic entry gate 23 has allowed five dairy animals B access to the waiting area 21, the automatic entry gate 23 can pass this information on to the control system 12 in order to successively milk at least five dairy animals B from the waiting area 21. In this case, the automatic access system 24 can be actuated in order to only allow dairy animals B from the waiting area 21 access to the milking box 3 during the milking of these dairy animals B from the waiting area 21. When the milking of the desired number of dairy animals B from the waiting area 21 has taken place, the milking system 2 can be flushed, if desired after identification of a subsequent dairy animal.

If new dairy animals B are allowed access from the waiting area 21 during milking of the dairy animals B, the minimum number of dairy animals to be milked can be increased accordingly.

FIG. 4 shows an alternative embodiment of the construction from FIG. 3. In this construction, a second waiting area 25 is provided for gathering dairy animals from a certain subgroup. In this embodiment, both dairy animals A from the first subgroup and dairy animals B from the second subgroup can be gathered in the waiting areas 25 and 21, respectively.

Both the waiting area 21 and the waiting area 25 are provided with an automatic entry gate 22, 26 with an identification system 23, 27. The dairy animals A, B, are thus automatically gathered in the respective waiting area 21, 15. Alternatively, this operation can also be carried out manually.

Based on the numbers of dairy animals present in the waiting areas 21, 25, the number of dairy animals to be milked successively from the first and/or second subgroup can be determined. On the basis of these data, the automatic access system 24 can selectively allow dairy animals from one of the two waiting areas 21, 25 access to the milking box 3. In this way, the milking system 2 can be used still more efficiently.

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A construction for milking a group of dairy animals, wherein the group comprises at least two subgroups, wherein a first subgroup comprises dairy animals which give a first type of milk and a second subgroup comprises dairy animals which give a second type of milk, the construction comprising:
    a milking system for milking the dairy animals;
    an identification system for identifying each dairy animal which presents itself for milking and identifying whether the animal belongs to the first or second subgroup;
    a flushing device for flushing the milking system; and
    a control device, wherein the control device is configured to:
        refuse milking at the milking system of a currently identified dairy animal that presented itself to be milked at the milking system if the animal belongs to a different subgroup from the last milked dairy animal, until a maximum number of refusals for that subgroup, and
        actuate flushing of the milking system before milking of the currently identified dairy animal, based on a condition that the currently identified dairy animal belongs to the first subgroup and the last milked dairy animal belongs to the second subgroup.

2. The construction according to claim 1, wherein the system comprises at least one waiting area for gathering dairy animals from one of the two subgroups.

3. The construction according to claim 2, wherein the construction comprises a second waiting area for gathering dairy animals from the other of the two subgroups.

4. The construction according to claim 3, wherein the construction has an automatic access system for selectively allowing dairy animals access to the milking system from at least one of: the waiting area, the second waiting area and another area.

5. The construction according to claim 4, wherein at least one of the waiting area and the second waiting area comprises an automatic entry gate for allowing dairy animals access to the waiting area and second waiting area, respectively.

6. The construction according to claim 1, wherein the first type of milk is milk for consumption and the second type of milk is separation milk.

7. The construction according to claim 1, wherein identification system identifies the dairy animal before the control device determines if the dairy animal is to be milked, and wherein the control device only allows access to the milking system if it is determined that the dairy animal is to be milked.

8. The construction according to claim 1, wherein the control device is configured to refuse milking of the currently identified dairy animal if the animal belongs to a different subgroup from the last milked dairy animal, until a minimum number of dairy animals from the subgroup of the last milked dairy animal have been milked successively, unless the maximum number of refusals for the subgroup of the currently identified animal has been reached.

9. The construction according to claim 1, wherein the control device is configured to urge a refused dairy animal away from the milking system for milking a next dairy animal.

10. The construction according to claim 1, wherein the first subgroup gives consumption milk, and the second subgroup gives separation milk.

11. The construction according to claim 8, wherein the minimum number of dairy animals to be milked from one of the two subgroups is determined on the basis of at least one of:
    a ratio between dairy animals from the one subgroup and the other subgroup,
    a ratio between the number of expected milkings in the one subgroup and the other subgroup per at least one of unit time, and
    a type of the second type of milk.

12. The construction according to claim 8, wherein the control device is configured to receive manual input on the minimum number of dairy animals to be milked from the first subgroup.

* * * * *